(12) United States Patent
Yudenfriend et al.

(10) Patent No.: US 8,108,570 B2
(45) Date of Patent: *Jan. 31, 2012

(54) DETERMINING THE STATE OF AN I/O OPERATION

(75) Inventors: Harry M. Yudenfriend, Poughkeepsie, NY (US); Daniel F. Casper, Poughkeepsie, NY (US); John R. Flanagan, Poughkeepsie, NY (US); Matthew J. Kalos, Tucson, AZ (US); Dale F. Riedy, Poughkeepsie, NY (US); Louis W. Ricci, Hyde Park, NY (US); Roger G. Hathorn, Tucson, AZ (US); Gustav E. Sittmann, Tucson, AZ (US); Ugochukwu C. Njoku, Yonkers, NY (US); Catherine C. Huang, Poughkeepsie, NY (US); Scott M. Carlson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/030,989

(22) Filed: Feb. 14, 2008

(65) Prior Publication Data

US 2009/0210573 A1    Aug. 20, 2009

(51) Int. Cl.
*G06F 3/00* (2006.01)
(52) U.S. Cl. .................. 710/19; 710/3; 710/4; 710/20; 711/1; 711/100; 711/101
(58) Field of Classification Search .................. 710/19, 710/3, 4, 20; 711/167, 1, 100, 101
See application file for complete search history.

(56) References Cited

U.S. PATENT DOCUMENTS 3,943,283 A    3/1976  Caragliano et al.
(Continued)

FOREIGN PATENT DOCUMENTS

DE    3931514    3/1990
(Continued)

OTHER PUBLICATIONS

Brice, et al.; U.S. Appl. No. 11/464,613, "Flexibility Controlling the Transfer of Data Between Input/Output Devices and Memory"; filed Aug. 15, 2006; Specification having 23 pages and Drawings having 4 sheets.

(Continued)

*Primary Examiner* — Mike Lee
*Assistant Examiner* — Ernest Unelus
(74) *Attorney, Agent, or Firm* — Cantor Colburn LLP; John Campbell

(57) ABSTRACT

A state of an input/output (I/O) operation in an I/O processing system is determined. A request for performing the I/O operation is received from an I/O operating system at a channel subsystem and forwarded to a control unit controlling an I/O device for executing the I/O operation. After a predetermined amount of time passes without receiving indication from the control unit that the I/O operation is completed, an interrogation request is received at the channel subsystem from the I/O operating system for determining the state of the I/O operation. An interrogation command is sent from the channel subsystem to the control unit. A response is received from the control unit, the response indicates a state of the I/O device executing the I/O operation, a state of the control unit controlling the I/O device executing the I/O operation, and the state of the I/O operation being executed.

20 Claims, 14 Drawing Sheets

U.S. PATENT DOCUMENTS

| | | |
|---|---|---|
| 4,004,277 A | 1/1977 | Gavril |
| 4,374,415 A | 2/1983 | Cormier et al. |
| 4,380,046 A | 4/1983 | Frosch et al. |
| 4,455,605 A | 6/1984 | Cormier et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,386,512 A | 1/1995 | Crisman et al. |
| 5,388,219 A | 2/1995 | Chan et al. |
| 5,410,727 A | 4/1995 | Jaffe et al. |
| 5,434,980 A | 7/1995 | Casper et al. |
| 5,440,729 A | 8/1995 | Kimura et al. |
| 5,461,721 A | 10/1995 | Cormier et al. |
| 5,465,359 A | 11/1995 | Allen et al. |
| 5,500,942 A | 3/1996 | Eickemeyer et al. |
| 5,526,484 A | 6/1996 | Casper et al. |
| 5,539,918 A | 7/1996 | Allen et al. |
| 5,546,533 A | 8/1996 | Koyama |
| 5,561,809 A | 10/1996 | Elko et al. |
| 5,584,039 A | 12/1996 | Johnson et al. |
| 5,600,793 A | 2/1997 | Nord |
| 5,613,163 A | 3/1997 | Marron et al. |
| 5,640,600 A | 6/1997 | Satoh et al. |
| 5,758,190 A | 5/1998 | Johnson et al. |
| 5,768,620 A | 6/1998 | Johnson et al. |
| 5,831,985 A | 11/1998 | Sandorfi |
| 5,860,022 A | 1/1999 | Kondou et al. |
| 5,894,583 A | 4/1999 | Johnson et al. |
| 5,901,327 A | 5/1999 | Ofek |
| 5,918,028 A | 6/1999 | Silverthorn et al. |
| 6,230,218 B1 | 5/2001 | Casper et al. |
| 6,343,335 B1 | 1/2002 | Dahman et al. |
| 6,353,612 B1 | 3/2002 | Zhu et al. |
| 6,484,217 B1 | 11/2002 | Fuente et al. |
| 6,546,435 B1 * | 4/2003 | Yoshimura et al. ............... 710/4 |
| 6,584,511 B1 | 6/2003 | Marsh, III et al. |
| 6,609,161 B1 | 8/2003 | Young |
| 6,647,016 B1 | 11/2003 | Isoda et al. |
| 6,651,125 B2 * | 11/2003 | Maergner et al. ............ 710/244 |
| 6,658,603 B1 | 12/2003 | Ward |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,164,425 B2 | 1/2007 | Kwak et al. |
| 7,202,801 B2 | 4/2007 | Chou |
| 7,277,387 B2 | 10/2007 | Sanders et al. |
| 7,315,911 B2 | 1/2008 | Davies et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,030 B2 | 3/2009 | Hathorn et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 * | 7/2009 | Kawashima et al. ......... 709/206 |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 2001/0030943 A1 | 10/2001 | Gregg et al. |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0056000 A1 | 3/2003 | Mullendore et al. |
| 2003/0084213 A1 | 5/2003 | Brice, Jr. et al. |
| 2003/0158998 A1 * | 8/2003 | Smith ........................ 711/112 |
| 2003/0188053 A1 | 10/2003 | Tsai |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0204069 A1 | 9/2005 | Carlson et al. |
| 2005/0223291 A1 | 10/2005 | Zimmer et al. |
| 2005/0257118 A1 | 11/2005 | Shien |
| 2006/0036769 A1 * | 2/2006 | Frey et al. .................... 709/248 |
| 2006/0050726 A1 | 3/2006 | Ahmed et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0059638 A1 | 3/2008 | Hathorn et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 * | 9/2008 | Chintada et al. ............... 714/749 |
| 2008/0256264 A1 | 10/2008 | Muto et al. |
| 2008/0273518 A1 * | 11/2008 | Pratt et al. .................... 370/345 |
| 2008/0307122 A1 | 12/2008 | Butler et al. |
| 2009/0055585 A1 * | 2/2009 | Fernandes et al. ............ 711/114 |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |

| | | | |
|---|---|---|---|
| 2009/0210582 | A1 | 8/2009 | Bendyk et al. |
| 2009/0210583 | A1 | 8/2009 | Bendyk et al. |
| 2009/0210584 | A1 | 8/2009 | Carlson et al. |
| 2009/0210585 | A1 | 8/2009 | Ricci et al. |
| 2009/0210768 | A1 | 8/2009 | Carlson et al. |
| 2009/0210769 | A1 | 8/2009 | Casper et al. |
| 2009/0210884 | A1 | 8/2009 | Ricci et al. |
| 2009/0307388 | A1 | 12/2009 | Tchapda |
| 2010/0014526 | A1 | 1/2010 | Chavan et al. |
| 2010/0064072 | A1 | 3/2010 | Tang et al. |

FOREIGN PATENT DOCUMENTS

| | | |
|---|---|---|
| GB | 1264096 | 2/1972 |
| GB | 2291990 | 2/1996 |
| JP | 63236152 | 10/1988 |
| JP | 2010-140127 A | 6/2010 |
| WO | WO2006102664 A2 | 9/2006 |

OTHER PUBLICATIONS

Casper, et al.; U.S. Appl. No. 11/548,060, "Facilitating Input/Output Processing By Using Transport Control Words to Reduce Input/Output Communications"; filed Oct. 16, 2006; Specification having 32 pages and Drawings having 12 sheets.
Casper, et al.; U.S. Appl. No. 11/548,093, "Facilitating Access to Status and Measurement Data Associated With Input/Output Processing"; filed Oct. 16, 2006; Specification having 33 pages and Drawings having 12 sheets.
Dauby, et al. "Contention Resolution Between Two Processors"; IBM Technical Disclosure Bulletin; vol. 26; No. 10A; Mar. 1984; 3 pages.
DeVeer, J.A.; "Control Frame Multiplexing on Serial I/O Channels"; IBM Technical Disclosure Bulletin; vol. 32; No. 10A; Mar. 1990; pp. 39-40.
Golasky, Richard; "Link-Level Error Recovery With Tape Backup"; Dell Power Solutions; Aug. 2005; pp. 88-91.
"IBM® z/Architecture Principles of Operation", Publication No. SA22-7832-05, 6th Edition, Apr. 2007. 1,215 pages separated into 4 electronic attachments.
Peterson, David; "Information Technology, Fibre Channel Protocol for SCSI, Fourth Version (FCP-3)", Draft Proposed American National Standard, Jun. 2004; pp. 1-142.
Snively, et al.; "Fibre Channel Single Byte Command Code Sets-3 Mapping Protocol (FC-SB-3)"; T11/Project 1357-D/Rev. 1.6, INCITS; Mar. 2003; pp. 1-206.
Snively, et al.; "Fibre Channel, Framing and Signaling"; (FC-FS) Rev. 1.70; NCITS Working Draft Proposed American National Standard for Information Technology; Feb. 2002; pp. i-575.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
"Information Technology—Fibre Channel Protocol for SCSI, Third Version (FCP-3)," T10 Project 1560-D, Revision 4g, Sep. 13, 2005.
U.S. Appl. No. 12/031,038 Non-Final Office Action dated Nov. 16, 2009.
U.S. Appl. No. 12/030,975 Non-Final Office Action dated Oct. 22, 2009.
U.S. Appl. No. 12/030,932 Non-Final Office Action dated Dec. 16, 2009.
U.S. Appl. No. 12/031,023 Non-Final Office Action dated Oct. 29, 2009.
U.S. Appl. No. 12/030,951 Non-Final Office Action dated Nov. 23, 2009.
U.S. Appl. No. 12/030,961 Non-Final Office Action dated Dec. 17, 2009.
U.S. Appl. No. 12/030,939 Non-Final Office Action dated Nov. 16, 2009.
U.S. Appl. No. 12/030,993 Non-Final Office Action dated Oct. 28, 2009.
U.S. Appl. No. 12/031,021 Non-Final Office Action dated Jan. 8, 2010.
U.S. Appl. No. 12/181,662—Non-Final Office Action dated Jun. 18, 2009.
U.S. Appl. No. 12/181,662—Final Office Action dated Jan. 4, 2010.
Iren, et al.; "The Transport Layer: Tutorial and Survey"; ACM Computing Surveys; vol. 31, No. 4; Dec. 1999; pp. 360-405.
International Search Report and Written Opinion for PCT/EP2009/051447 dated Jul. 1, 2009.
International Search Report and Written Opinion for PCT/EP2009/051483 dated Jul. 27, 2009.
Nordstrom.; "Sequence Reception Method for a Fibre Channel Protocol Chip"; IBM Technical Disclosure Bulletin; vol. 38, No. 12; Dec. 1995; pp. 267-269.
U.S. Appl. No. 11/548,060 Non-Final Office Action dated Apr. 15, 2008.
U.S. Appl. No. 11/548,093 Non-Final Office Action dated Apr. 17, 2008.
"Protocol for Insochronous Traffic Over Fiber Channel Switching"; IBM Technical Disclosure Bulletin; vol. 37, No. 06B; Jun. 1994. pp. 377-380.
Sachs, M.W.; "I/O Marker Changing"; IBM Technical Disclosure Bulletin; vol. 37, No. 02A; Feb. 1994; pp. 75-76.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
U.S. Appl. No. 12/183,315, filed Jul. 31, 2008.
U.S. Appl. No. 12/183,323, filed Jul. 31, 2008.
U.S. Appl. No. 12/183,305, filed Jul. 31, 2008.
"z/Architecture—Principles of Operation," IBM Publication No. SA22-7832-04, 5th Ed., Sep. 2005.
Written Opinion and International Search Report for PCT/EP2009/051461 dated Sep. 22, 2009.
U.S. Appl. No. 12/031,182 Non-Final Office Action dated Jan. 22, 2010.
U.S. Appl. No. 12/030,954 Non-Final Office Action dated Jan. 21, 2010.
U.S. Appl. No. 12/031,201 Non-Final Office Action dated Jan. 25, 2010.
International Search Report; International Application No. PCT/EP2009/059184; International Filing Date: Jul. 16, 2009; Date of mailing: Jan. 14, 2010; 9 pages.
U.S. Appl. No. 12/030,912 Non-Final Office Action dated Mar. 18, 2010.
U.S. Appl. No. 12/030,920 Non-Final Office Action dated Feb. 23, 2010.
International Search Report; International Application No. PCT/EP2009/059184; International Filing Date: Jul. 7, 2009; Date of mailing: Jan. 14, 2010; 9 pages.
Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,954, Notice of Allowance mailed Dec. 28, 2010.
U.S. Appl. No. 12/030,932, Non-Final Office Action Mailed Dec. 16, 2010.
U.S. Appl. No. 12/031,023, Final Office Action Mailed Nov. 18, 2010.

U.S. Appl. No. 12/031,201, Non-Final Office Action Mailed Dec. 27, 2011.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/183,315, Notice of Allowance Mailed Dec. 13, 2010.
U.S. Appl. No. 12/183,323, Non-Final Office Action Mailed Jan. 3, 2011.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
Moore et al., Reconfiguration of Storage Elements to Improve Performance, IBM, Dec. 1983, pp. 1-3. http://priorartdatabas.com/IPCOM/000047719I.
Behrs, Jr, "Adaptive Prediction Minimizes Data Overrun and Underrun", IBM, Nov. 1994, pp. 1-3. http://priorartdatabase.com/IPCOM/000114189.
U.S. Appl. No. 12/031,038, Notice of Allowance Mailed Oct. 6, 2010.
Final Office Action for U.S. Appl. No. 12/030,912 mailed Oct. 6, 2010.
U.S. Appl. No. 12/031,182 Final Office Action Mailed Jul. 22, 2010.
U.S. Appl. No. 12/030,920 Notice of Allowance Mailed Aug. 23, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/031,201, Final Office Action Mailed Aug. 3, 2010.
U.S. Appl. No. 12/031,042, Final Office Action Mailed Oct. 25, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/183,305, Notice of Allowance Mailed Nov. 1, 2010.
IBM, "Method and Apparatus to Monitor PAV Utilization", Feb. 2005, pp. 1-3. http://priorartdatabase.com/IPCOM/000082878.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External—Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
U.S. Appl. No. 12/030,967 Restriction Requirement Mailed Dec. 29, 2009.
"American National Standard for Information Technology—Fibre Channel—Link Services (FC-LS)", ANSI INCITS 433-2007, Jul. 2007, 211 pgs., American National Standards Institure, Inc.
"Fibre Channel Single Byte Command Code Sets-2 Mapping Protocol (FC-SB-3)" T11/Project 1357-D/Rev 1.6, INCITS Mar. 2003, 206 pgs., American National Standards Institute.
U.S. Appl. No. 12/030,951 Non-Final Office Action dated May 20, 2010.
U.S. Appl. No. 12/031,038, Non-Final Office Action Mailed Apr. 15, 2010.
U.S. Appl. No. 12/030,975. Final Office Action Mailed May 13, 2010.
U.S. Appl. No. 12/030,967, Notice of Allowance mailed Apr. 23, 2010.
U.S. Appl. No. 12/030,985, Non Final Office Action Mailed May 5, 2010.
U.S. Appl. No. 12/031,042, Non-Final Office Action Mailed Apr. 5, 2010.
U.S. Appl. No. 12/031,021, Notice of Allowance Mailed Jul. 8, 2010.
U.S. Appl. No. 12/031,021, Notice of Allowance Mailed Apr. 30, 2010.
U.S. Appl. No. 12/183,305, Non-Final Office Action Mailed May 11, 2010.
U.S. Appl. No. 12/183,315 Notice of Allowance dated Jun. 15, 2010.
"Information Technology—SCSI Primary Commands—4 (SPC-4)"; Project T10/1731-D. Rev 11. INCITS Apr. 14, 2010, 785 pgs., American National Standards Institute.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.

* cited by examiner

DETERMINING THE STATE OF AN I/O OPERATION

BACKGROUND OF THE INVENTION

1. Field of the Invention

The present disclosure relates generally to input/output processing, and in particular, to determining the state of an I/O operation.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The operating system may employ channel command words (CCWs) by passing them to the channel subsystem in order to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands is to be sent to the control unit for processing. The channel ensures that each command is sent to the control unit in its own entity. Further, the channel obtains certain information associated with processing the response from the control unit for each command.

Depending on a link protocol used, an operating system may have difficulty making an informed decision regarding what action to take with an I/O operation that is taking a longer time than expected or allotted to complete. Accordingly, there is a need to provide the operating system with a way of determining the state of an I/O operation and determining an action to take for an I/O operation that is taking longer than the expected or allotted time to execute.

BRIEF SUMMARY OF THE INVENTION

Embodiments of the invention include a computer program product for determining a state of an input/output (I/O) operation in an I/O processing system. The computer program product comprises a tangible storage medium readable by a processing circuit and storing instructions for executing by the processing circuit for performing a method. The method comprises receiving, at a channel subsystem, a request for performing the I/O operation from an I/O operating system, the request having an associated time period for completion of the I/O operation; responsive to the request, forwarding a transport command control block (TCCB) from the channel subsystem to a control unit controlling an I/O device for executing the I/O operation, the TCCB including at least one device control word (DCW) and the TCCB being obtained by a location identified by a transport control word (TCW). The method further comprises receiving, at the channel subsystem, an interrogation request from the I/O operating system at a point in time prior to the expiration of the associated time period and absent an indication from the control unit that the I/O operation is completed, the interrogation request for determining the state of the I/O operation, and the point in time within a threshold of the expiration of the associated time period; responsive to receipt of the interrogation request at the channel subsystem, sending an interrogation command from the channel subsystem to the control unit to determine the state of the I/O operation and receiving, at the channel subsystem, a response from the control unit indicating the state of the I/O operation. The response includes information indicating a state of the I/O device executing the I/O operation, a state of the control unit controlling the I/O device executing the I/O operation, and the state of the I/O operation being executed.

Additional embodiments include an apparatus adapted to communicate with a control unit controlling an input/output (I/O) device executing an I/O operation in an I/O processing system. The apparatus comprises a channel subsystem for communication with an I/O operating system and the control unit. The channel subsystem performs a method comprising receiving a request for performing the I/O operation from the I/O operating system, the request having an associated time period for completion of the I/O operation; responsive to the request, forwarding a transport command control block (TCCB) to the control unit controlling the I/O device for executing the I/O operation, the TCCB including at least one device control word (DCW) and the TCCB being obtained by a location identified by a transport control word (TCW). The method further comprises receiving an interrogation request from the I/O operating system at a point in time prior to the expiration of the associated time period and absent an indication from the control unit that the I/O operation is completed, the interrogation request for determining a state of the I/O operation, and the point in time within a threshold of the expiration of the associated time period; responsive to receipt of the interrogation request, sending an interrogation command to the control unit to determine the state of the I/O operation; and receiving a response from the control unit indicating the state of the I/O operation. The response includes information indicating a state of the I/O device executing the I/O operation, a state of the control unit controlling the I/O device executing the I/O operation, and the state of the I/O operation being executed.

Further embodiments include a method for determining a state of an input/output (I/O) operation in an I/O processing system. The method comprises receiving, at a channel subsystem, a request for performing the I/O operation from an I/O operating system, the request having an associated time period for completion of the I/O operation; responsive to the request, forwarding a transport command control block (TCCB) from the channel subsystem to a control unit controlling an I/O device for executing the I/O operation, the TCCB including at least one device control word (DCW) and the TCCB being obtained by a location identified by a transport control word (TCW). The method further comprises receiving, at the channel subsystem, an interrogation request from the I/O operating system at a point in time prior to the expiration of the associated time period and absent an indication from the control unit that the I/O operation is completed, the interrogation request for determining the state of the I/O operation, and the point in time within a threshold of the expiration of the associated time period; responsive to receipt of the interrogation request at the channel subsystem, sending an interrogation command from the channel subsystem to the control unit to determine the state of the I/O operation; and receiving, at the channel subsystem, a response from the control unit indicating the state of the I/O operation. The response includes information indicating a state of the I/O device executing the I/O operation, a state of the control unit controlling the I/O device executing the I/O operation, and the state of the I/O operation being executed.

Other systems, methods, and/or computer program products according to embodiments will be or become apparent to one with skill in the art upon review of the following drawings and detailed description. It is intended that all such additional systems, methods, and/or articles of manufacture be included within this description, be within the scope of the present invention, and be protected by the accompanying claims.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

Figure 1:
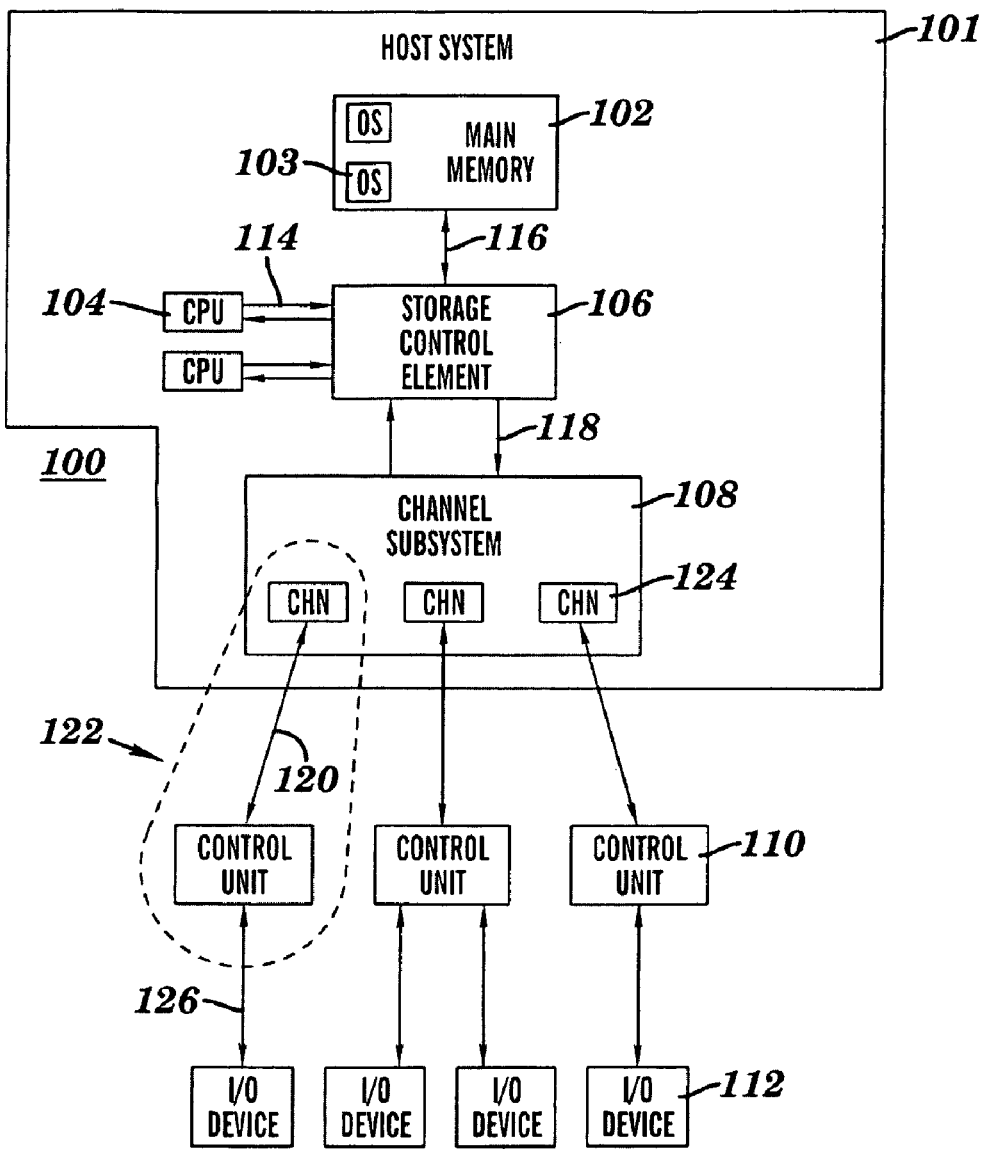
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. For instance, I/O processing is facilitated by readily enabling access to the information, such as status and measurement data, associated with I/O processing. Further, I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands is included in a block, referred to herein as a transport command control block (TCCB), an address of which is specified in a transport control word (TCW). The TCW is sent from an operating system or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the control unit generates a response message including status and extended status information in response to executing the channel program. The control unit may also generate a response message without executing the channel program under a limited number of communication scenarios, e.g., to inform the I/O communications adapter that the channel program will not be executed. The control unit may include a number of elements to support communication between the I/O communications adapter and I/O devices, as well as in support of channel program execution. For example, the control unit can include control logic to parse and process messages, in addition to one or more queues, timers, and registers to facilitate communication and status monitoring. The I/O communications adapter parses the response message, extracting the status and extended status information, and performs further calculations using the extracted information, such as determining an extended measurement word.

One example of an I/O processing system incorporating and using one or more aspects of the present invention is described with reference to FIG. 1. I/O processing system 100 includes, for instance, a main memory 102, one or more central processing units (CPUs) 104, a storage control element 106, a channel subsystem 108, one or more control units 110 and one or more I/O devices 112, each of which is described below.

Main memory 102 stores data and programs, which can be input from I/O devices 112. For example, the main memory 102 may include one or more operating systems 103 that are executed by one or more of the CPUs 104. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

Channel subsystem 108 is coupled to storage control element 106, as described above, and to each of the control units 110 via a connection 120, such as a serial link. Connection 120 may be implemented as an optical link, employing single-mode or multi-mode waveguides. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) represents the logical state of a device to the program. Each subchannel provides information concerning the associated I/O device 112 and its attachment to channel subsystem 108. The subchannel also provides information concerning I/O operations and other functions involving the associated I/O device 112. The subchannel is the means by which the channel subsystem 108 provides information about associated I/O devices 112 to operating systems running on CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
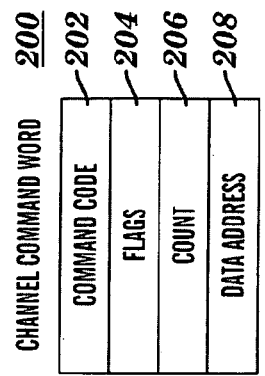
FIG. 2A depicts one example of a channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-2 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is, fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to read 4k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408. TCWs, TCCBs, and status are described in further detail below.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
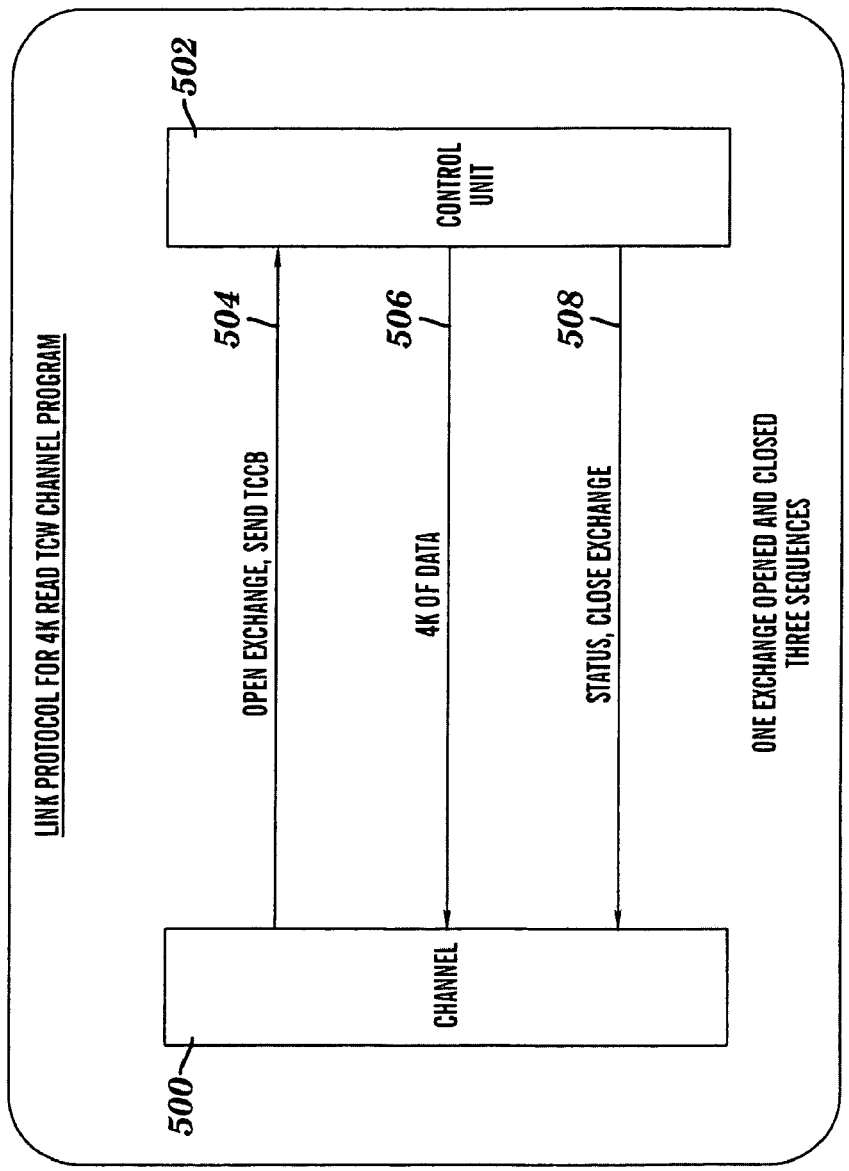
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RES_IU payload may be used to transport FICON ending status along with additional status information, including parameters that support the calculation of extended measurement words and notify the channel 500 of the maximum number of open exchanges supported by the control unit 502.

In a further example, to write 4k of customer data, the channel 500 uses the FCP link protocol phases, as follows:
1. Transfer a TCCB in the FCP_CMND IU.
2. Transfer the IU of data, and sequence initiative to the control unit 502. (FCP Transfer Ready Disabled)
3. Final status is sent in a FCP status frame that has a bit active in, for instance, byte 10 or 11 of the FCP_RSP IU Payload. The FCP_RES_INFO field or sense field is used to transport FICON ending status along with additional status information, including parameters that support the calculation of extended measurement words and notify the channel 500 of the maximum number of open exchanges supported by the control unit 502.

Figure 2B:
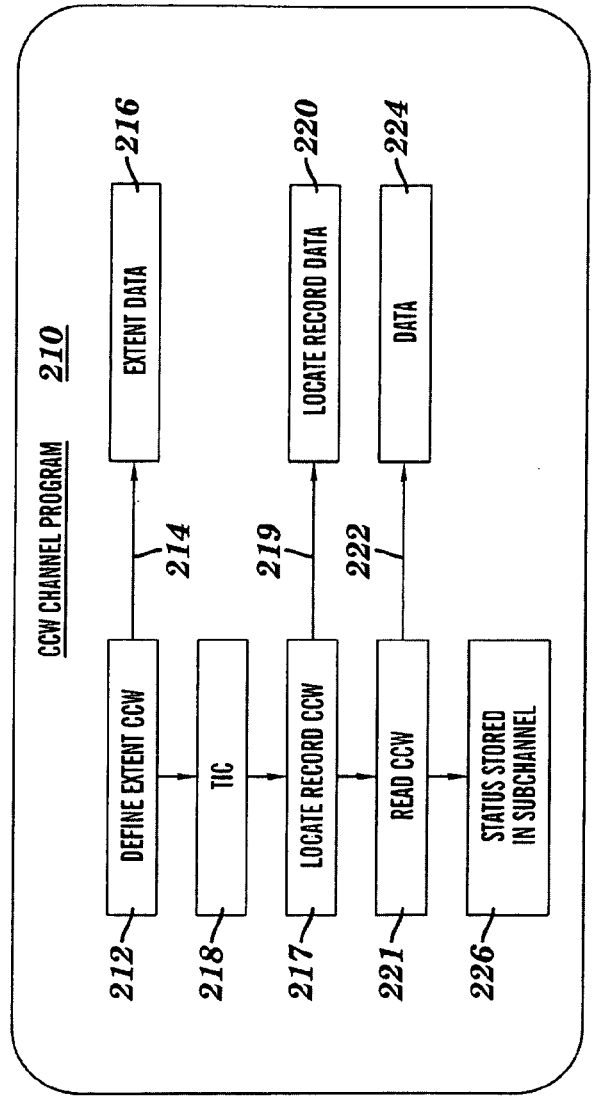
FIG. 2B depicts one example of a channel command word channel program.
Figure 3:
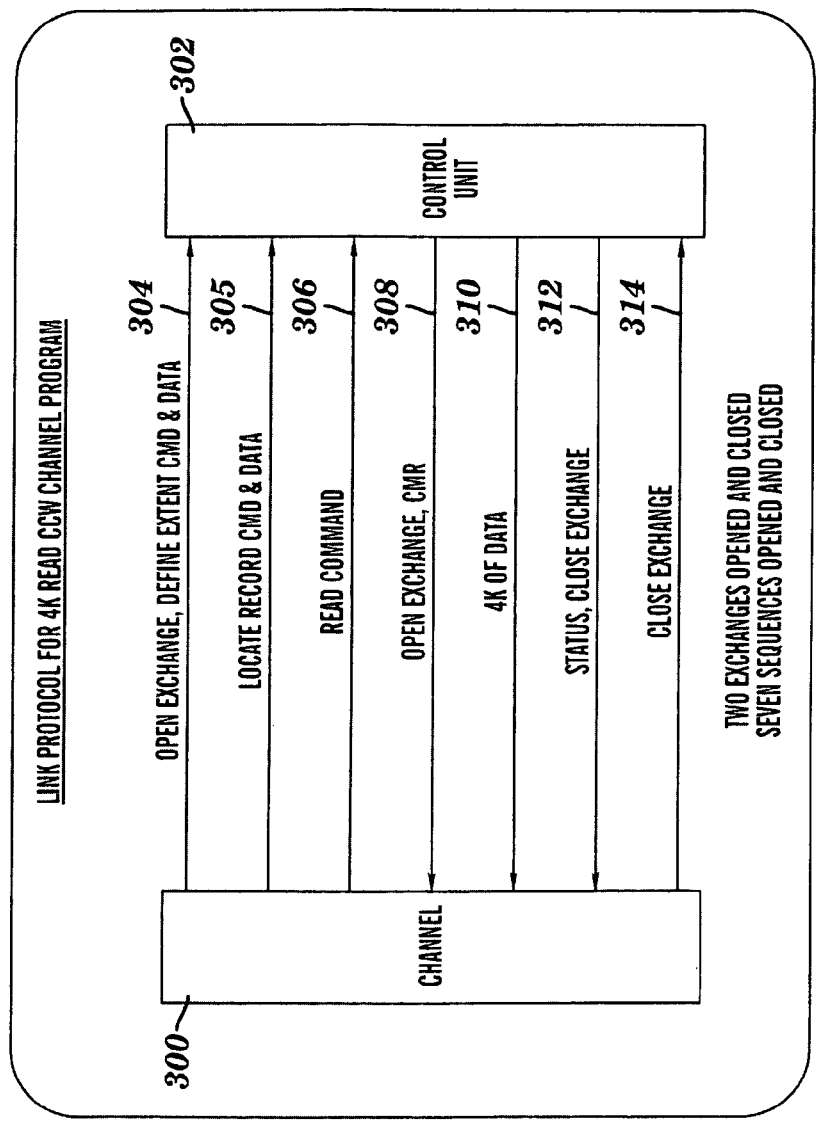
FIG. 3 depicts one embodiment of a link protocol used in communicating between a channel and control unit to execute the channel command word channel program of FIG. 2B.
Figure 4:
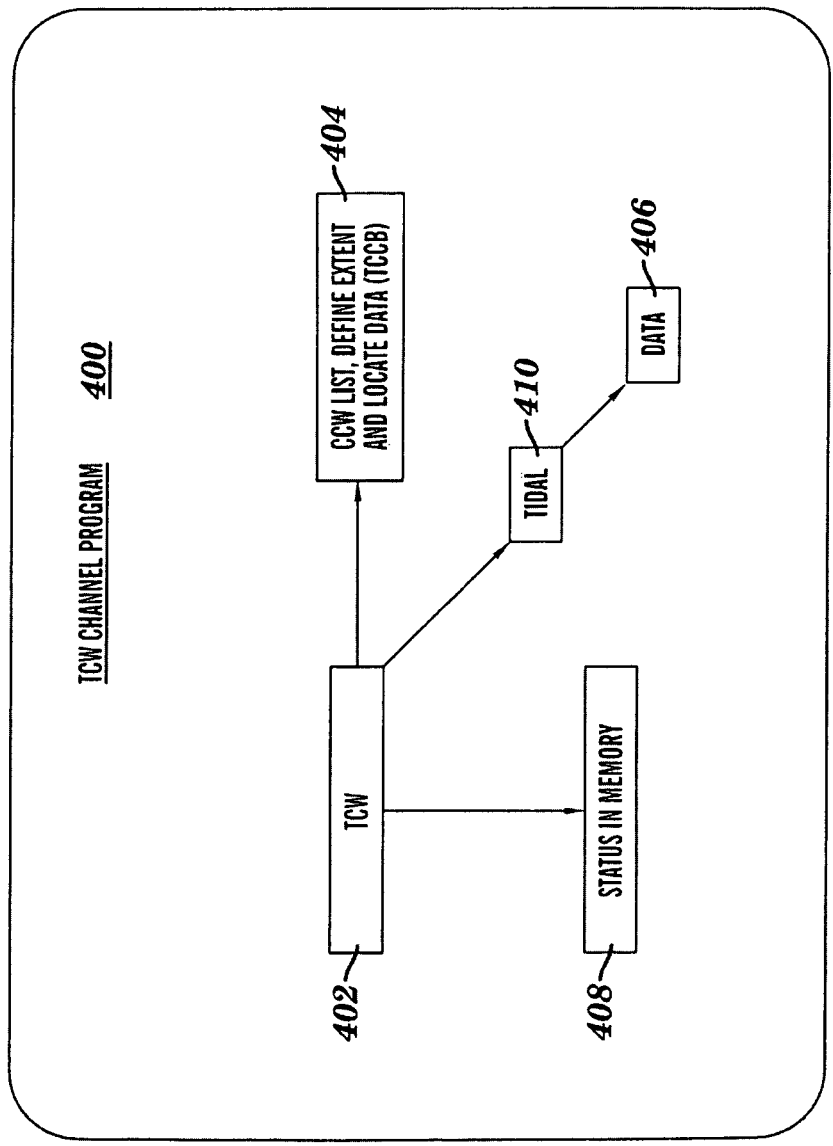
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
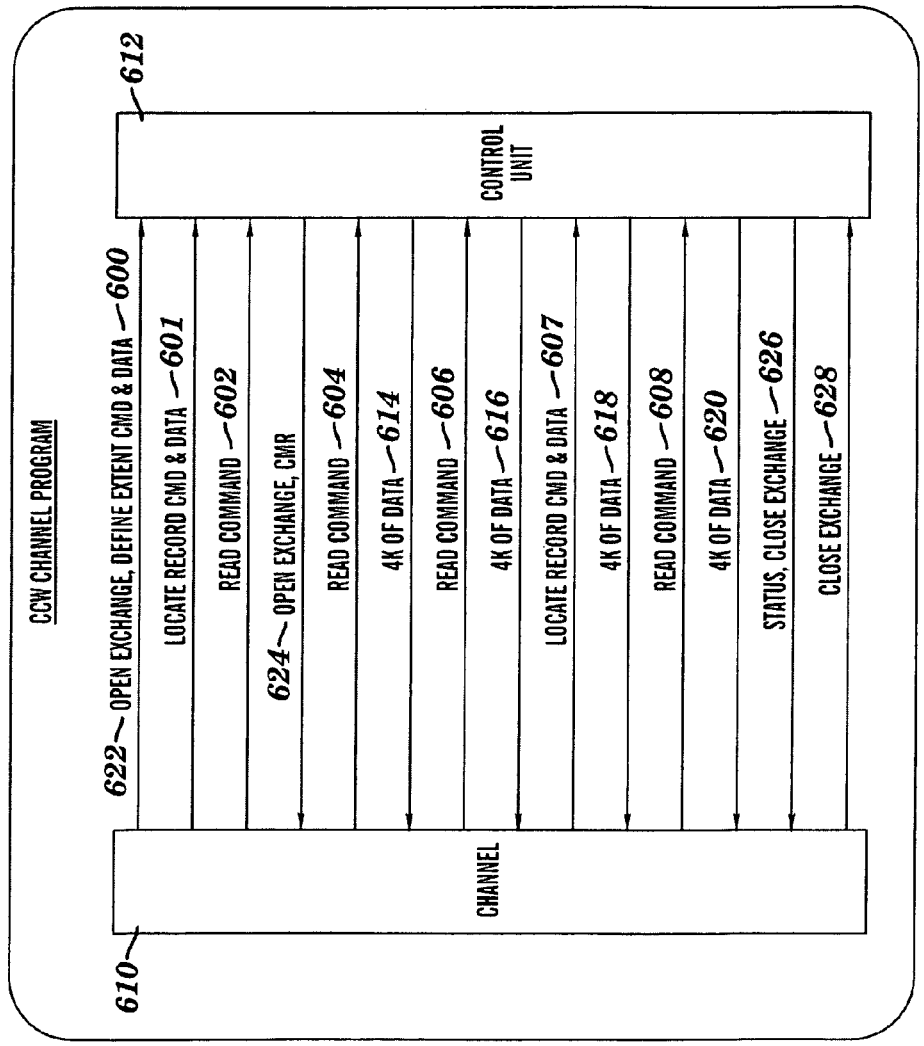
FIG. 6 depicts one embodiment of a link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
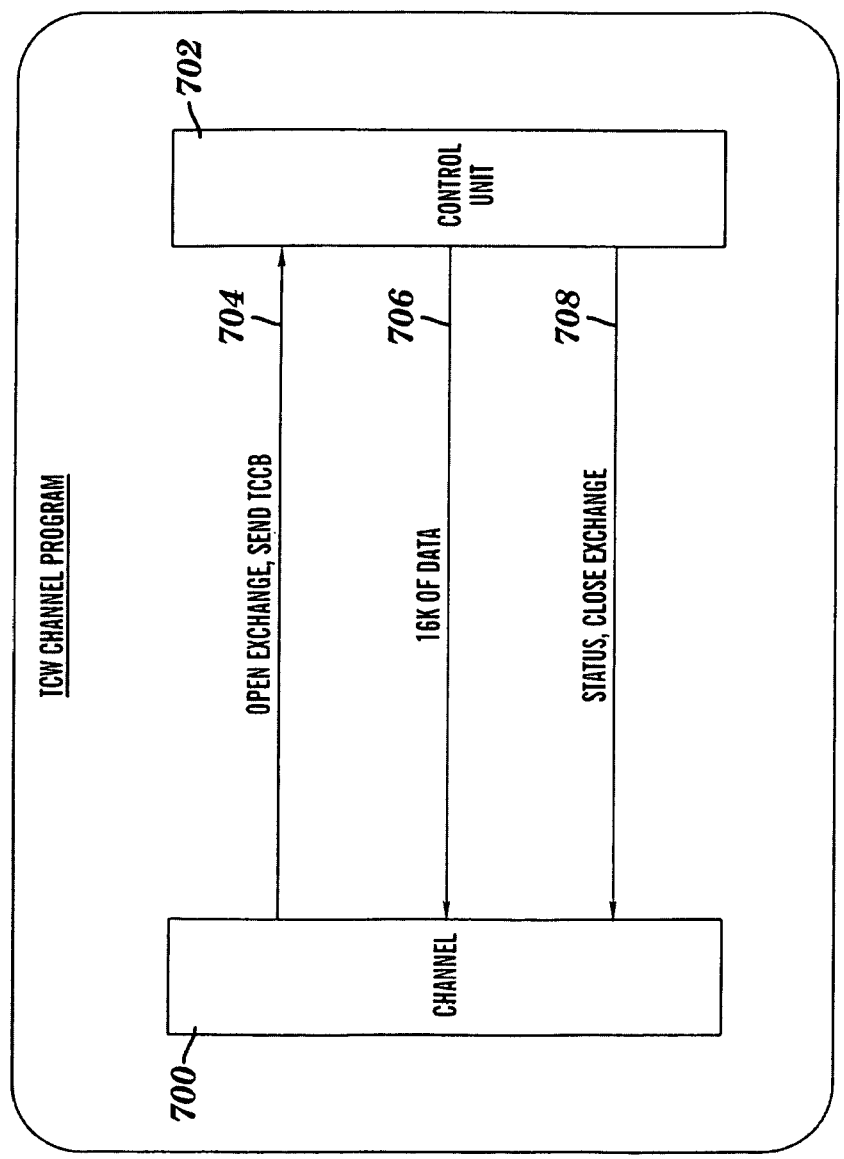
FIG. 7 depicts one embodiment of a link protocol used to communicate between a channel and control unit to process the four read commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16k of data 706 to the channel 700. Additionally, the control unit 702 provides status to the channel 700 and closes the exchange 708. Thus, the TCW channel program requires much less overhead to transfer the same amount of data as the CCW channel program of FIG. 6.

Figure 8:
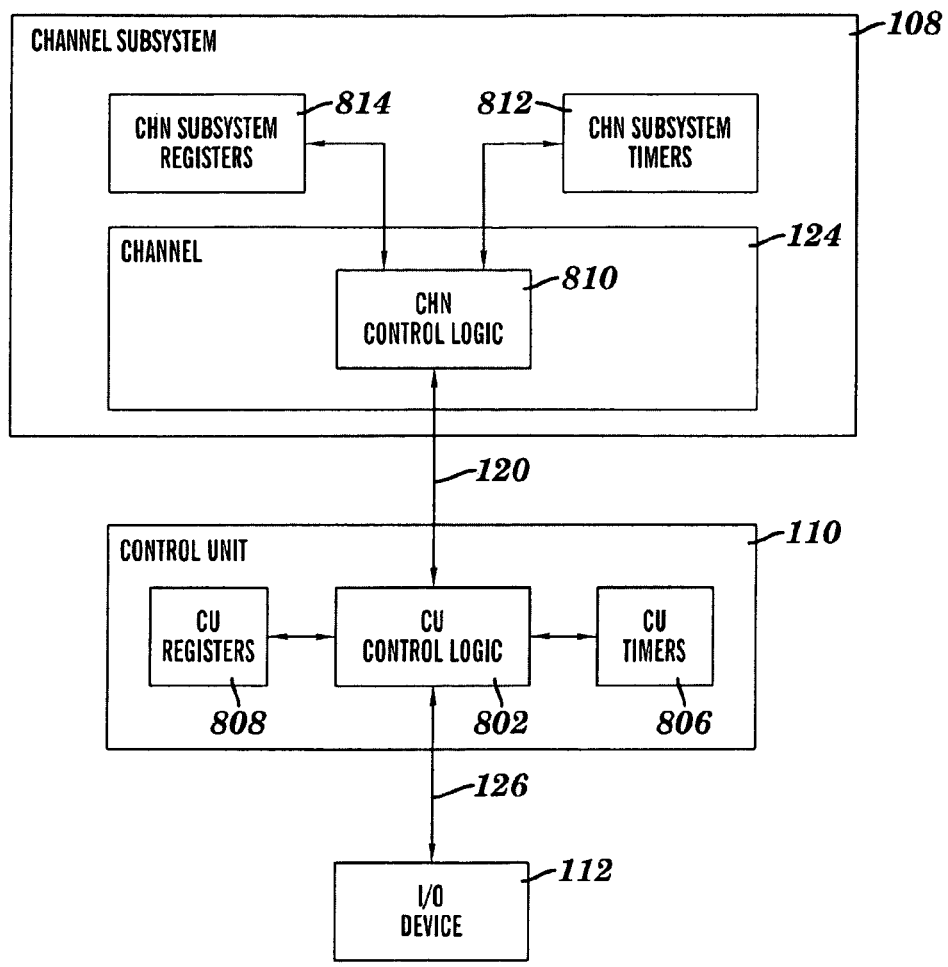
FIG. 8 depicts one embodiment of a control unit and a channel, in accordance with an aspect of the present invention.

Turning now to FIG. 8, one embodiment of the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a devices, for instance, I/O device 112 via connection 126. The CU control logic 802 sends device commands and data to the I/O device 112, as well as receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 802 keeps track of and stores device busy messages and associated data in a device busy queue 804.

The CU control logic 802 can access and control other elements within the control unit 110, such as CU timers 806 and CU registers 808. The CU timers 806 may include multiple timer functions to track how much time a sequence of I/O operations takes to complete. The CU timers 806 may further include one or more countdown timers to monitor and abort I/O operations and commands that do not complete within a predetermined period. The CU registers 808 can include fixed values that provide configuration and status information, as well as dynamic status information that is updated as commands are executed by the CU control logic 802. The control unit 110 may further include other buffer or memory elements (not depicted) to store multiple messages or status information associated with communications between the channel 124 and the I/O device 112. The CU registers 808 may include a maximum control unit exchange parameter that defines the maximum number of open control unit exchanges that the control unit 110 supports.

The channel 124 in the channel subsystem 108 includes multiple elements to support communication with the control unit 110. For example, the channel 124 may include CHN control logic 810 that interfaces with CHN subsystem timers 812 and CHN subsystem registers 814. In an exemplary embodiment, the CHN control logic 810 controls communication between the channel subsystem 108 and the control unit 110. The CHN control logic 810 may directly interface to the CU control logic 802 via the connection 120 to send commands and receive responses, such as transport command and response IUs. Alternatively, messaging interfaces and/or buffers (not depicted) can be placed between the CHN control logic 810 and the CU control logic 802. The CHN subsystem timers 812 may include multiple timer functions to track how much time a sequence of I/O operations takes to complete, in addition to the time tracked by the control unit I/O. The CHN subsystem timers 812 may further include one or more countdown timers to monitor and abort command sequences that do not complete within a predetermined period. The CHN subsystem registers 814 can include fixed values that provide configuration and status information, as well as dynamic status information, updated as commands are transported and responses are received.

The FICON command response (CMR) frame from the control unit is not part of the Fibre Channel Extension (FCX), transport mode protocol. Removing the CMR from the transport mode protocol helps to improve the performance of FCX. The CMR in FICON informs the channel that the control unit has received and does the channel send executing the command. When the FICON channel receives the CMR, the channel marks the subchannel as "SubChannel and Active Device".

In all computing environments, interrupts at various I/O devices may occur. If an OS that requested an operation at an I/O device fails to detect an interrupt, this may cause operations in a data processing system to slow down and ultimately cease. A Missing Interrupt Handler (MIH) is a mechanism included, e.g., in the OS 103 that is useful in detecting lost interrupts by timing I/O operations that are in progress and determining whether the time taken by an I/O device to execute an operation has exceeded a predetermined "normal" amount of time allotted or set for execution of the operation. If the MIH time is reached, and the I/O device has not completed execution of the operation, this is an indication that an interrupt may have been missed, a link failure occurred, an adapter failure occurred, a control unit error occurred, or a reserve was held by a sharing system longer than expected.

When the operating system MIH times out for FICON, i.e., the MIH time is reached, it looks to see if the sub-channel was or was not marked "SubChannel and Device Active" to determine what action to take next. For FCX, the subchannel stays "Start pending" during the entire operation. So, with FCX, when the MIH times out, the I/O operating system cannot tell the state of the I/O operation because the sub-channel state stays "Start pending" for the entire operation.

In accordance with an aspect of the present invention, just before a missing interrupt timeout, e.g., one second before the MIH time is reached, the operating system uses an interrogate command to determine the state of the I/O operation at the control unit. The interrogate command may be initiated with a cancel subchannel instruction before the time allotted for completion of the execution of the I/O operation elapses, and the I/O operation has not completed.

There are several benefits of the interrogate command. For example, the interrogate command is executed when a MIH timeout is about to occur, thereby removing the requirement for a CMR on every I/O operation. Removing the requirement for the CMR on every I/O operation improves the FCX performance by reducing fabric traffic and channel and adapter overhead. Also, the interrogate command transfers information to the control unit about the OS for logging by the control unit if a timeout does occur. Another advantage is that, the control unit provides detailed state information about the I/O operation back to the OS, whereas the CMR for FICON only indicates that the control unit is currently executing the I/O. Also, if an I/O operation is lost, the information exchanged by the interrogate command is very useful for problem determination.

Implementation of the interrogation described herein involves a cancel subchannel instruction and an Interrogate—TCW Address field in a TCW and is described from the channel subsystem perspective, an interrogate command and response from the channel subsystem perspective, and an interrogate command and response from the control unit perspective. Each of these is described below.

Figure 9:
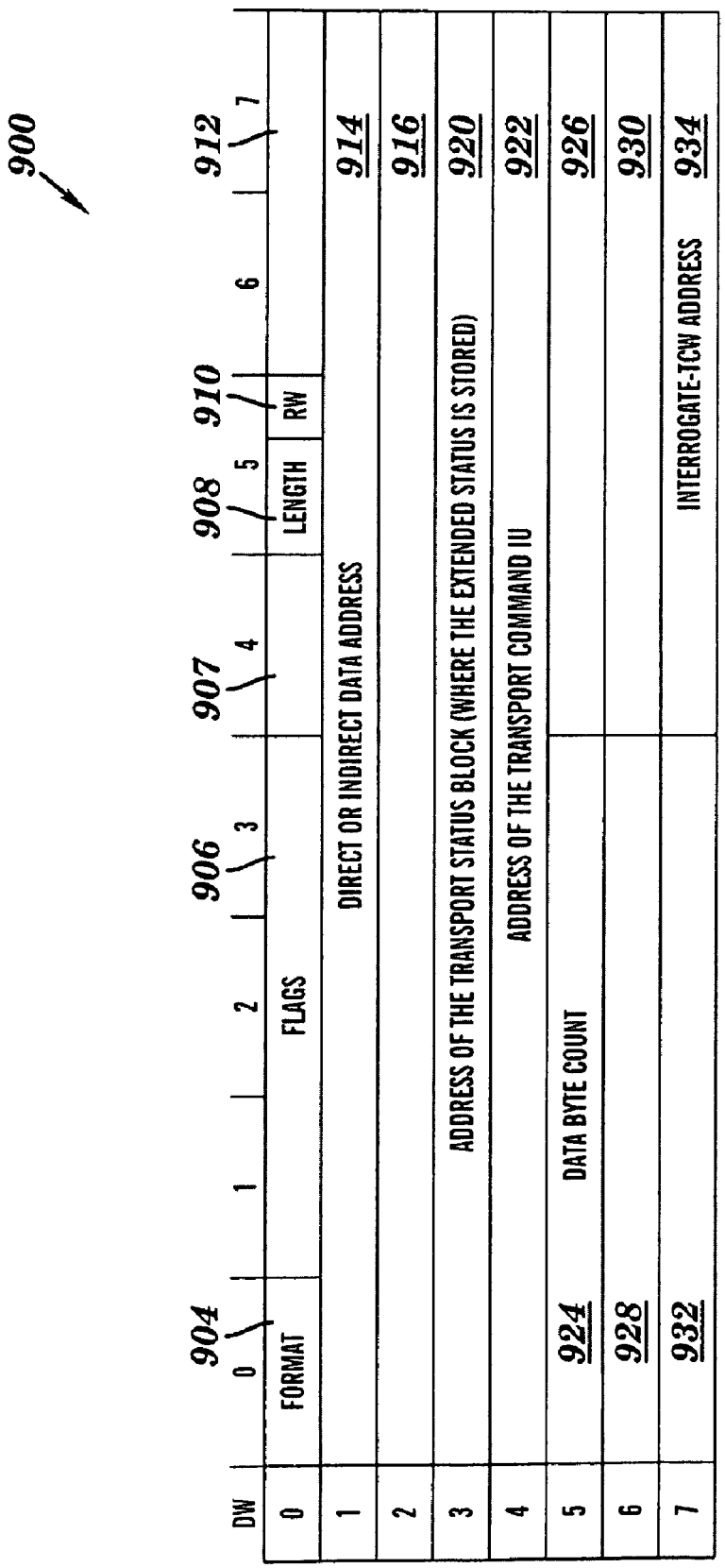
FIG. 9 depicts one embodiment of a Transport Control Word (TCW) including an Interrogate-TCW Address field in accordance with an aspect of the present invention.

An exemplary embodiment of a transport control word (TCW) 900 is depicted in FIG. 9. The TCW 900 is utilized by the channel 124 to set up the I/O operation and is not sent to the control unit 110. The TCW depicted in FIG. 9 is for the implementation of the interrogation from the channel subsystem perspective.

In an exemplary TCW 900 depicted in FIG. 9, a format field 904 equal to, e.g., "00b" indicates that what follows is a TCW

900. The TCW 900 also includes a flags field 906. The first five bits of the flags field 906 are reserved for future use and are set to zero. The sixth bit of the flags field 906 is a TIDAL data address flag. In an exemplary embodiment, the TIDAL data address flag is set to one when the data address field 914 contains an address of a TIDAL. If the TIDAL data address flag is set to zero, then the data address field 914 contains a data address. The seventh bit of the flags field 906 is a TCCB TIDAL flag. In an exemplary embodiment, the TCCB TIDAL flag is set to one when the TCCB address field 922 contains an address of a TCCB TIDAL. If the TCCB TIDAL flag is set to zero, then the TCCB address field 922 directly addresses the TCCB. The eighth through twenty-forth bits of the flags field 906 are reserved for future use. Field 907 may be reserved for future use.

The TCW 900 also includes a TCCB length field 908, which indirectly represents the length of the TCCB and may be utilized to determine the actual length of the TCCB. A R/W 910 field includes read/write bits utilized to indicate whether data is being read and/or written as a result of executing the TCW 900. In an exemplary embodiment, the read bit in the read/write bits is set to one to indicate that input data is being transferred from an I/O device 112 to system storage (e.g., main memory 102) in the host system 101 as a result of executing the TCW 900. The write bit in the read/write bits is set to one to indicate that output data is being transferred from system storage (e.g., main memory 102) in the host system 101 to an I/O device as a result of executing the TCW 900. Field 912 may be reserved for future use.

Address field 914 may include a direct address or an indirect address per the flags field bit 6. The contents of the address field 914 may be an address of a TIDAL (a list of transport mode indirect data address words) for output data or the actual address of the output data. The contents of the address field 914 may be an address of a TIDAL for input data or the actual address of the input data. In an exemplary embodiment, the output data address and the input data address are included in a single field 914, and a field 916 is reserved for future use. Alternatively, the output data address and the input data address may be split between fields 914 and 916.

The TCW 900 also includes a transport-status-block address field 920. A portion (e.g., the extended status part) of a completion status in a transport response IU for an I/O operation is stored at this address. The TCCB address field 922 in the TCW 900 includes an address where the TCCB is located in system storage. This is the control block where the DCWs to be executed for the TCW 900 reside. Also as described in the flags field bit 7, the contents of the TCCB address field 922 may be an address of a TIDAL for the TCCB or the actual address of the TCCB. A data byte count field 924 in the TCW 900 indicates the amount of output data to be transferred by the TCW for an output operation or the amount of input data to be transferred by the TCW for an input operation. Field 926 may be reserved for future use. Alternatively, the output data count and the input data count information may be split between fields 924 and 926. Several additional fields in the TCW 900 are reserved: reserved field 928, reserved field 930 and reserved field 932.

According to an aspect of the invention, the TCW 900 is expanded, e.g., from 32 bytes to 64 bytes, to allow more space for future functions. One such function is an interrogation function, made possible by an interrogate-TCW address field 934 that contains an interrogation value indicating whether an interrogation should be performed if an I/O fails to complete in an allotted time period. The interrogate-TCW address field 934 may contain the address of another TCW and may used by the channel 124 to interrogate the state of an operation under the initiative of a cancel sub-channel I/O instruction, explained in detail below.

The TCW 900 may be set up by software to be used by the channel to drive I/O operations. The TCW depicted in FIG. 9 is one example of how a command word can be configured. Other configurations are possible where additional fields are included and/or fields depicted in FIG. 9 are not included.

According to an aspect of the present invention, a cancel subchannel instruction is executed to determine the state of the control unit if the FCX start subchannel has already been sent to a channel. If the subchannel is "start pending", and the start subchannel has been sent to the channel, and the value of the interrogate TCW address field in the TCW is not zero, then the cancel instruction queues an interrogate command in the subchannel that may be sent to the control unit by the channel subsystem. This interrogate command may cause information to be retuned from the control unit about the state of the operation being interrogated, in a data transfer phase or in the extended status part of the transport response IU. The protocol of the interrogate operation may be implemented as follows.

If a FCX I/O operation is active, the Interrogate TCW Address in the TCW for the I/O operation is used to point to an interrogate TCW. If the channel encounters a zero value Interrogate TCW Address, the channel will not initiate the Interrogate. Prior to a Missing Interrupt (MIH) time out, the OS updates the Interrogate TCW Address word in the TCW with the address of the Interrogate TCW if the OS wants to interrogate the I/O device. If the OS only wants to send the cancel instruction without conducting an interrogation, then the OS leaves the Interrogate TCW Address in the TCW set to zero. The interrogate initiative is then passed to the channel subsystem with the cancel instruction. The cancel instruction performs the current architected Cancel, but if the subchannel is "start pending" with a FCX start subchannel, and the Start has been passed to the channel, then the channel subsystem is given the initiative to interrogate the control unit.

According to aspects of the invention, if the subchannel is idle, interrupt pending with primary or alert status, or is device active only, the initiative to issue the interrogate command is discarded. If the channel receives the interrogate initiative at a "start pending" subchannel, and the start is still queued in the channel, the channel discards the interrogate initiative. If the channel receives the interrogate initiative, and the channel already has an interrogate operation in progress, the channel discards the new interrogate initiative.

If the channel receives the interrogate initiative to a UA that is start pending and has an exchange open to the control unit, the channel subsystem executes the interrogation. According to an aspect of the invention, in executing the interrogation, the channel subsystem does the following. The channel subsystem fetches the Interrogate TCW address in the current TCW to get the pointer value to fetch the Interrogate TCW. If the pointer is all zeros, the channel discards the interrogation. In this case, the OS wants to do a cancel instruction but not an interrogation. If the pointer is valid, the channel subsystem continues. The channel subsystem opens a new exchange and sends the Interrogate DCW inside a TCCB, addressed by the interrogate TCW, to the control unit in a transport command IU. This operation is timed by the channel for completion. If the interrogate operation does not complete in the amount of time set by the channel, the channel aborts both the interrogate operation and the operation that is being interrogated. The subchannel is then returned back to the OS with interface control check status.

The control unit receives and executes the interrogate command, transferring the interrogate information about the UA back to the channel subsystem in the transport response IU or as a data IU based on the command in the transport command IU. The original operation that is active on the UA that is being interrogated is not affected. The I/O subsystem may generate an intermediate status interrupt with an interrogate complete bit set to a one that reports the completion of the interrogation to the OS.

According to an aspect of the present invention, the interrogate command is a unique command that may be the same for all control unit types that support FCX. The transport command IU for an interrogation contains only one DCW. This interrogate DCW command may have up to 232 bytes of control data associated with it, which may be information that is passed to the control unit indicating why the interrogation is being executed.

Figure 10:
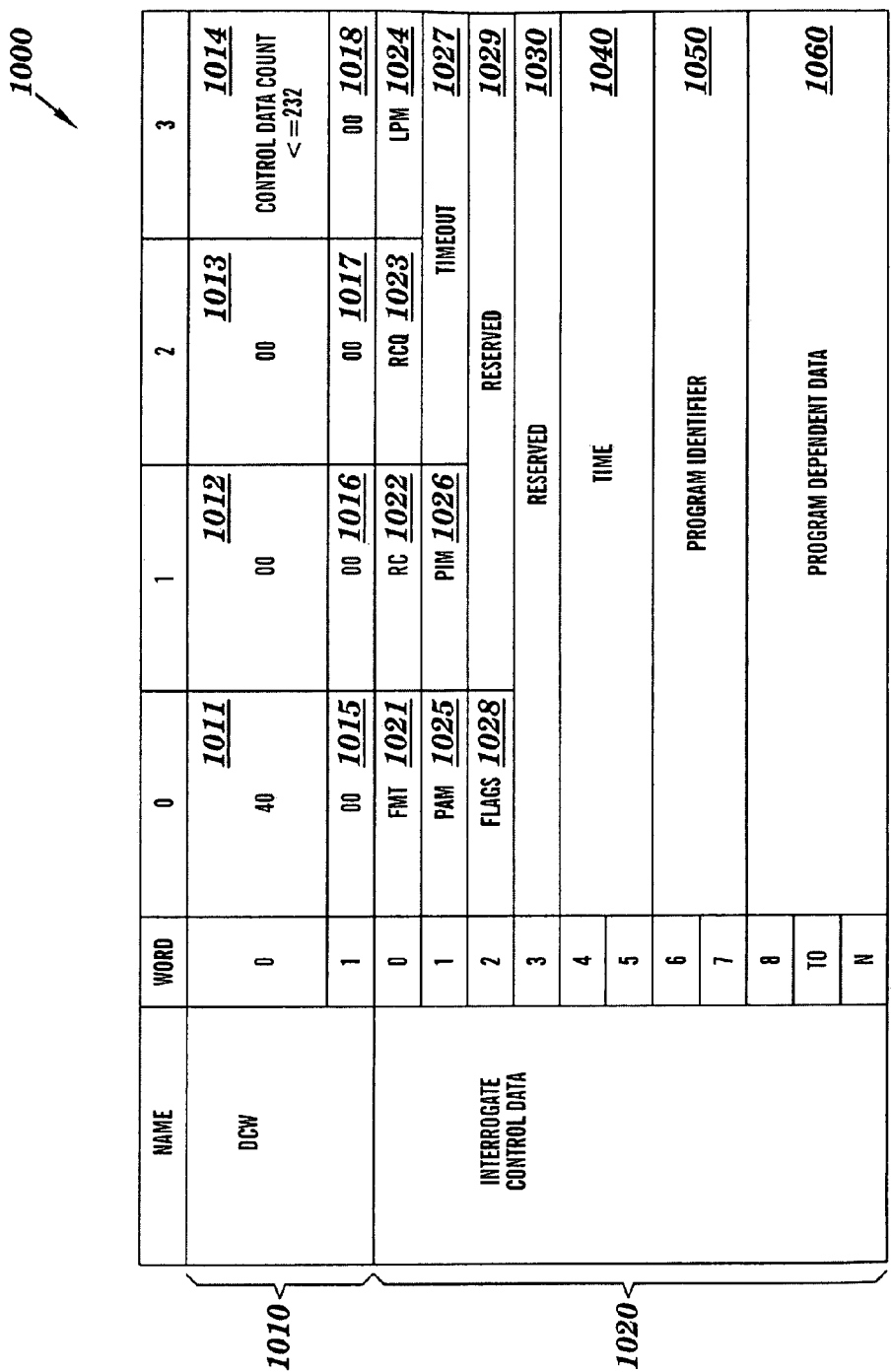
FIG. 10 depicts one embodiment of an Interrogate DCW in accordance with an aspect of the present invention.

The interrogate command transports information included in the interrogate DCW 1010 and the interrogate control data 1020 that are part of an interrogate command 1000 as shown in FIG. 10. The control unit responds with the transport response IU that returns information about the I/O operation back to the OS. The format of the information returned in the transport response IU in accordance with an aspect of the invention is shown as item 1100 in FIG. 11.

FIG. 10 depicts one embodiment of a DCW 1000 in accordance with an aspect of the present invention. In an exemplary embodiment, the DCW 1000 is eight bytes in length plus the length in the control data count field 1014. The DCW includes a command field 1011, a flags field 1012, a reserved field 1013, a control data (CD) count field 1014, and a data byte count field 1015, 1016, 1017 and 1018. The DCW command field 1011 is one byte in length and is the same as the CCW command byte utilized in a CCW (but may include additional command codes not utilized by a CCW). The flags field 1012 includes eight bits. In an exemplary embodiment, the second bit is a chain command to the next DCW 1000 in a TCCB. When this flag bit is set to zero, it indicates that this is the last DCW 1000 of the DCW program in the TCCB. The other bits in the flag field 1016 are reserved and set to zero. An interrogate DCW 1000 has a DCW command-code field 1011 containing a 40 hex. The control data count field 1014 indicates the amount of Interrogate control data that is included with the DCW. Fields 1015-1018 include the 4 byte data count of read data that may be transferred by the interrogate DCW.

If the control data count 1014 of the interrogate DCW is greater than zero, then interrogate control data is specified in the DCW. The interrogate control data 1020 sent to the control unit is for device-dependent logging purposes and is used to aid in debugging I/O timeouts.

According to an aspect of the invention, the interrogate control data 1020 has the format described below. Referring to FIG. 10, byte 0 of word 0 {Fmt field 1021} of the interrogate control data 1020 contains an unsigned integer value that defines the layout or format (FMT) of the interrogate data. Byte 1 of word 0 (RC field 1022) contains an unsigned integer value or reason code (RC) that indicates the reason an interrogate operation was initiated by the OS. The meaning of RC values may be as follows.

| 0 | Interrogate reason is not specified. |
|---|---|
| 1 | Timeout: Program-detected timeout for the operation being interrogated. |
| 2-255 | Reserved. |

Byte 2 of word 0 of the interrogate control data (RCQ field 1023) contains an unsigned integer value that indicates additional information about the reason the interrogate operation was initiated, referred to as the Reason-Code Qualifier (RCQ). When the RC field 1022 contains the value one, the meaning of RCQ values may be as follows:

| 0 | Interrogate reason qualifier not specified. |
|---|---|
| 1 | Primary: The timeout is detected by the primary program. |
| 2 | Secondary: The timeout is detected by the secondary program. |
| 3-255 | Reserved. |

When the RC field 1022 does not contain the value one, the RCQ may have no meaning.

Byte 3 of word 0 {LPM field 1024} contains the Logical-Path Mask (LMP) that was used when the operation being interrogated was initiating by a start subchannel command.

Referring to word 1 of the interrogate control data, byte 0 of word 1 {PAM field 1025} contains a value of a Path-Available Mask (PAM) at the time the interrogate operation is initiated. Byte 1 of word 1 (PIM field 1026) contains a value of a Path-Installed Mask (PIM) at the time the interrogate operation is initiated. Bytes 2-3 of word 1 (Timeout field 1027) are indicative of a timeout value indicating a time allotted for completion of the I/O operation. When the RC field 1022 contains the value of one and the RCQ field 1023 contains the value of one or two, bytes 2-3 of word 1 contain the timeout interval used by the program in unsigned integer seconds.

Referring to word 2 of the interrogate control data 1020, byte 0 (Flags field 1028) contains flags that have information about the interrogation. The meaning of each flag bit may be given as follows:

| Bit 0 | Multipath mode. |
|---|---|
| Bit 1 | Program path recovery. The interrogate is issued during path recovery by the program. |
| Bit 2 | Critical. The device is a critical device for the program. |
| Bits 3-7 | Reserved. |

As shown in FIG. 10, bytes 1-3 of word 2 {field 1029} and bytes 0-3 of word 3 {field 1030} may also be reserved for future use. Words 4-5 (Time field 1040) may contain information regarding the time the interrogate operation was initiated. Words 6-7 {field 1050} may contain a program identifier identifying the program initiating the interrogate operation. The content of this field may be program-dependent. Words 8-N (field 1060) may contain program-dependent information.

Figure 11:
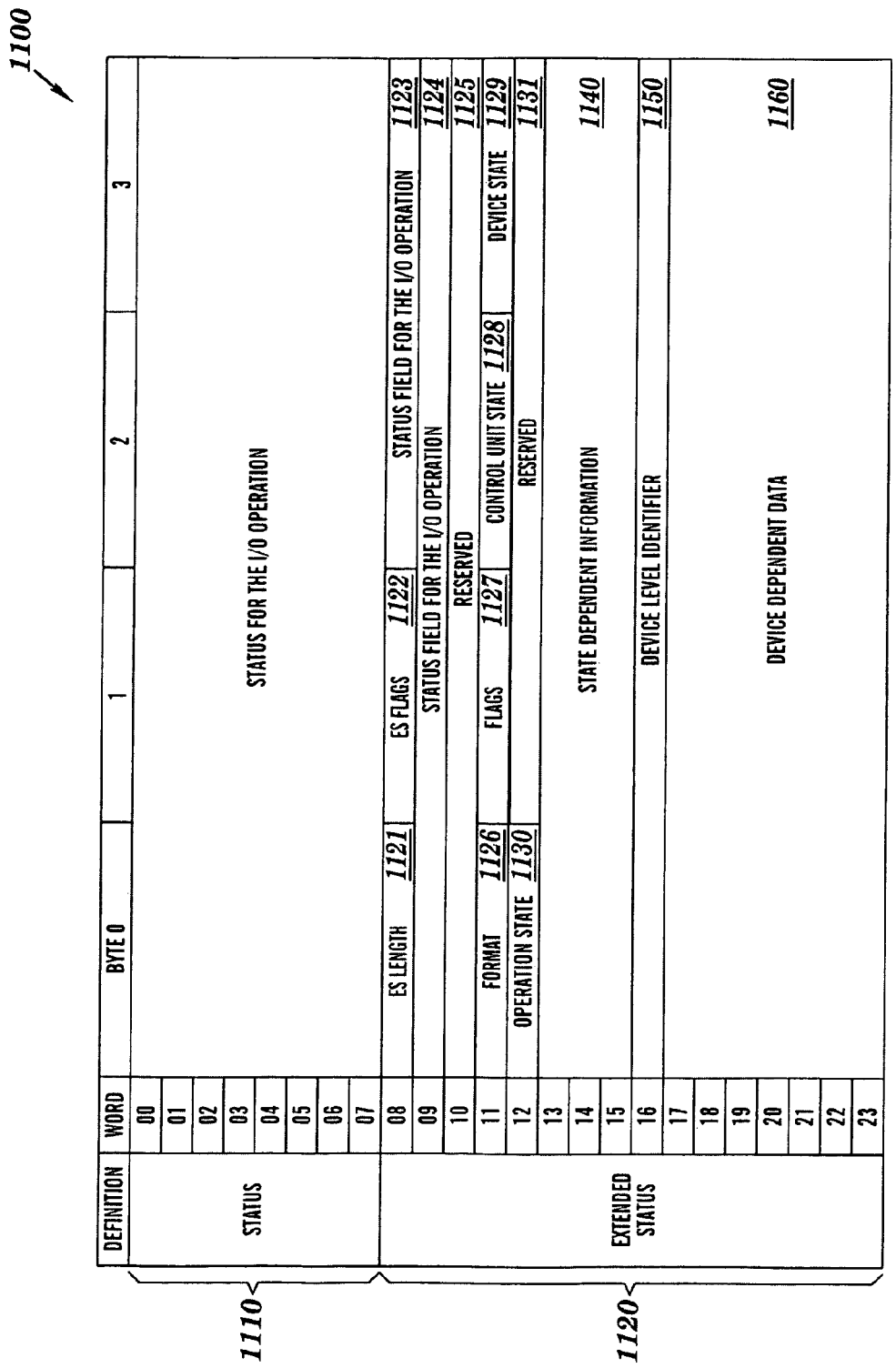
FIG. 11 depicts one embodiment of a Transport Response IU in accordance with an aspect of the present invention.

The ending status information for the interrogate command may be set by the control unit in a transport response IU payload as shown in FIG. 11. In the transport response IU 1100, words 0-7 may contain a status payload 1110, including ending status and status flags. Words 8-23 may contain an extended status payload 1120, which may be stored at the status block address in z memory per the transport status block address in the TCW for the interrogation.

As shown in FIG. 11, word 8 byte 0 (ES field 1121), contains the extended status (ES) Length, which indicates the size of the ES payload. Word 8, byte 1 (ES flags field 1122) includes ES flags. Flag bits 5-7 indicate the type code. The type code defines the format of the status area of the ES payload. The type code for an Interrogate is 3. The three bit encode defining the status area may be given as follows:

| | |
|---|---|
| 0 | Type Code 0. No information in the Status Areas. |
| 1 | Type code 1. Valid ending I/O status. |
| 2 | Type Code 2. Error terminated status. |
| 3 | Type Code 3. the Extended Status is an Interrogate Response, and the format is show in FIG. 11. |
| 4-7 | Reserved. |

Word 8, bytes 2 and 3 {status field 1123} and word 9 (status field 1124) contain information indicating a status of the I/O operation. For the I/O operation, the value in these fields may be zero for an interrogation.

Words 11-23 of the transport extended status payload 1120 may be the interrogate status area. Byte 0 of word 11 (Format field 1126) contains an unsigned integer value that defines the layout of the interrogate status area. If the value of this field is zero, the contents of the interrogate status are meaningless. The following definitions of the interrogate status area apply when the format byte is set to a (01h).

Byte 1 of word 11 (Flags field 1127) contains information about the interrogate status area. The meaning of each flag bit may be given as follows:

| | |
|---|---|
| Bit 0 | Control-width state valid: When bit 0 is one, the control unit state field contains meaningful information. When bit 0 is zero, the control unit state field has no meaning. |
| Bit 1 | Device-state valid: When bit 1 is one, the device state field contains meaningful information. When bit 1 is zero, the device state field has no meaning. |
| Bit 2 | Operation-state valid: When bit 2 is one, the operation-state field contains meaningful information. When bit 2 is zero, the operation-state field has no meaning. |
| Bits 3-7 | Reserved. |

Byte 2 of word 11 (control unit state field 1128) contains an 8-bit unsigned integer that indicates a current state of the control unit for the I/O device. The meaning of each value may be given as follows:

| | |
|---|---|
| 0 | Busy: The control unit is busy, and the device-dependent data field may contain additional information about the busy state. |
| 1 | Recovery: The control unit is performing a recovery process, and the device-dependent data field may contain additional information about the recovery state. |
| 2 | Interrogate maximum: The control unit is executing the maximum number of interrogate operations that it supports |
| 3-127 | Reserved. |
| 128-255 | Device dependent meanings. |

Byte 3 of word 11 (device state field 1129) contains an 8-bit unsigned integer that indicates a current state of the I/O device. The meaning of this byte may be given as follows:

| | |
|---|---|
| 0 | Path-group identification: The state-dependent-information field contains information identifying a path group that has the device reserved. |
| 1 | Long busy: The control unit is in a long-busy state. The meaning of long busy is device dependent, and the device-dependent field may contain additional information about the long-busy state. |
| 2 | Recovery: The device is performing a recovery process. |
| 3-127. | Reserved. |
| 128-255 | Device-dependent meanings. |

Byte 0 of word 12 (operation state field 1030) contains an 8-bit unsigned integer that indicates whether an IO operation is present at the device and, when present, the state of the operation. The meaning of this byte value may be given as follows.

| | |
|---|---|
| 0 | No I/O operation is present. |
| 1 | An I/O operation is present and executing. |
| 2 | An I/O operation is present and waiting for completion of an I/O operation that was initiated by another configuration. |
| 3 | An I/O operation is present and waiting for completion of an I/O operation that was initiated from the same device extent. |
| 4 | An I/O operation is present and waiting to perform a device-dependent operation. |
| 5-127 | Reserved. |
| 128-255 | Device dependent meanings. |

Field 1031 may be reserved for future use.

Words 13-15 (field 1140) may contain state-dependent information. The contents of this field are device dependent. Whether this field has meaning is designated by the CS, DS, and OS fields 1128, 1129, and 1130, respectively.

Word 16 (field 1150) may contain a device-level identifier or token that identifies the implementation level of the device.

Words 17-23 (field 1160) may contain device dependent information. Whether this field has meaning may be designated by the CS, DS and OS fields 1128, 1129, and 1130, respectively.

According to exemplary embodiments, from the control unit state, device state, and operating state information returned in the transport response IU for an interrogation, the OS 103 can make an informed decision on what action to take with regard to an I/O operation that is taking a longer than an allotted time to complete.

Figure 12A:
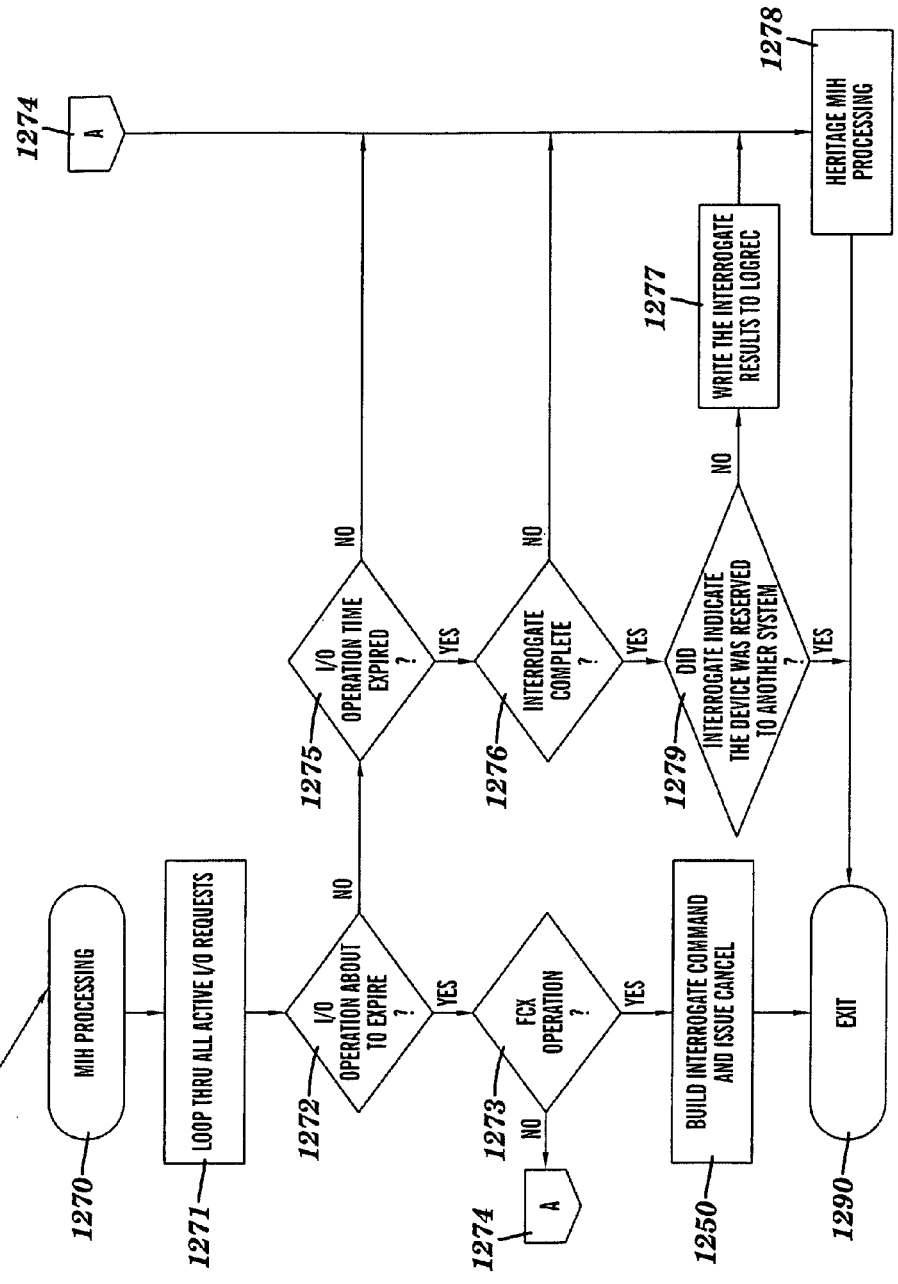
FIG. 12A depicts one embodiment of a process performed by the I/O operating system for deciding when to request the state of an I/O operation from the control unit in accordance with an aspect of the invention.

FIG. 12A illustrates a method that the operating system uses for deciding when to request the state of an I/O operation from the control unit in accordance with aspects of the invention. When a timer pop occurs at step 1265, the operating system Missing Interrupt Handler (MIH) receives control at step 1270. For example, the MIH receives control once every second after a timer pop occurs. The MIH scans through every active I/O operation that has been issued by all applications, middleware and subsystems running in the operating system at step 1271. A determination is made at step 1272 whether an I/O operation is about to expire, e.g., within one second of the time limit for the I/O operation. If so, a determination is made whether the I/O operation is for transport mode (FCX) at step 1273. If the I/O operation is for transport mode, then an interrogate DCW is constructed, and the active. TCW is updated to point to the interrogate command at step 1250. Otherwise, the process proceeds from step 1274 to step 1278 at which conventional "heritage" MIH processing is performed. From step 1250, MIH processing continues at step 1271 or terminates at step 1290 until a timer pop occurs, e.g., one second later at step 1265. If, at step 1272, it is determined that the I/O operation is not about to expire, then a check is made to see if the I/O operation time has exceeded its allotted time at step 1275. If the I/O operation has not exceeded its allotted time, then the traditional heritage (conventional) MIH processing occurs at step 1278. If the I/O operation time has indeed expired, then a check is made to see if the interrogate command has been issued at step 1276. If the interrogate command has not been issued, this is an indication that the command was not a transport mode command (FCX), and heritage MIH recovery processing is performed 1278. If, however, it is determined at step 1276 that the interrogate command has been issued and has successfully completed, then the interrogate results are examined at step 1279 to determine whether the devices is reserved for another system. If the interrogate information indicates that the device is reserved for another system 1140, then there is no error, and a missing interrupt has not occurred. Thus, processing terminates 1290. If the device is not reserved for some other system, the information returned by interrogate is placed into a record to be written to the system LOGREC dataset for diagnostic purposes at step 1277. Processing then continues with the heritage MIH processing at step 1278.

Figure 12B:
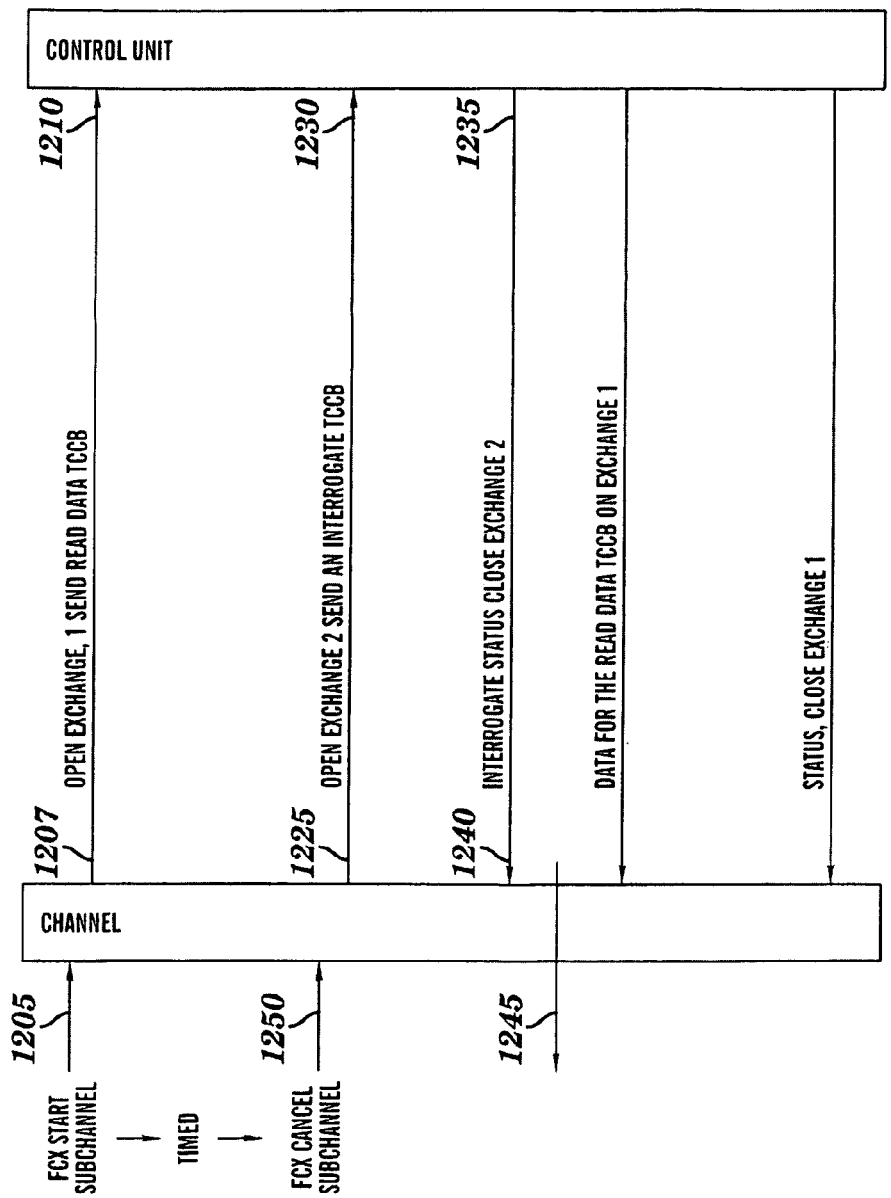
FIG. 12B depicts one embodiment of a process for interrogating a control unit to determine the state of an I/O operation in accordance with an aspect of the invention.

FIG. 12B illustrates a method for determining a state of an I/O operation according to aspects of the invention. A request for initiating an I/O operation is sent from an OS 103 to the channel subsystem 108 at step 1205 and on to a control unit 110 at step 1207. At step 1210, the request is received and processed at the control unit 110. If the I/O operation approaches the end of its allotted execution time, as described in the previous paragraph, an interrogate operation is initiated by the operating system at step 1250 shown in both. FIG. 12A and FIG. 12B.

The interrogation begins at step 1250 at which the OS 103 sets up the interrogate control blocks in system memory 102 and sends the cancel subchannel to the channel subsystem 108. The channel subsystem 108 determines if the interrogate is to be sent to the control unit. If the conditions as described above are not met to do an interrogate, the heritage MIH processing terminates the I/O operation and simulates an error back to the initiator of the I/O. If the interrogate conditions are met, the interrogation request is sent from the channel subsystem 108 to the control unit 110 at step 1225. At step 1230, the control unit 110 receives the interrogation request. At step 1235, the control unit 110 sends an interrogation response to the channel subsystem 108, indicating the state of the I/O operation, the control unit 110, and the I/O device 112 executing the interrogate I/O operation. At step 1240, the interrogation response is received at the channel subsystem 108, which generates an interrupt to the OS. The OS receives the interrogate response at step 1245, creates a LOGREC entry to record the state information at the control unit and then proceeds with the heritage MIH processing as described above.

It should be appreciated that not all of the steps shown in FIG. 12 need be performed to determine the state of an I/O operation Further, the order of steps shown in FIGS. 12A and 12B are examples of how the processes may be performed. Also, additional steps that are not shown in FIGS. 12A and 12B may be performed.

Figure 13:
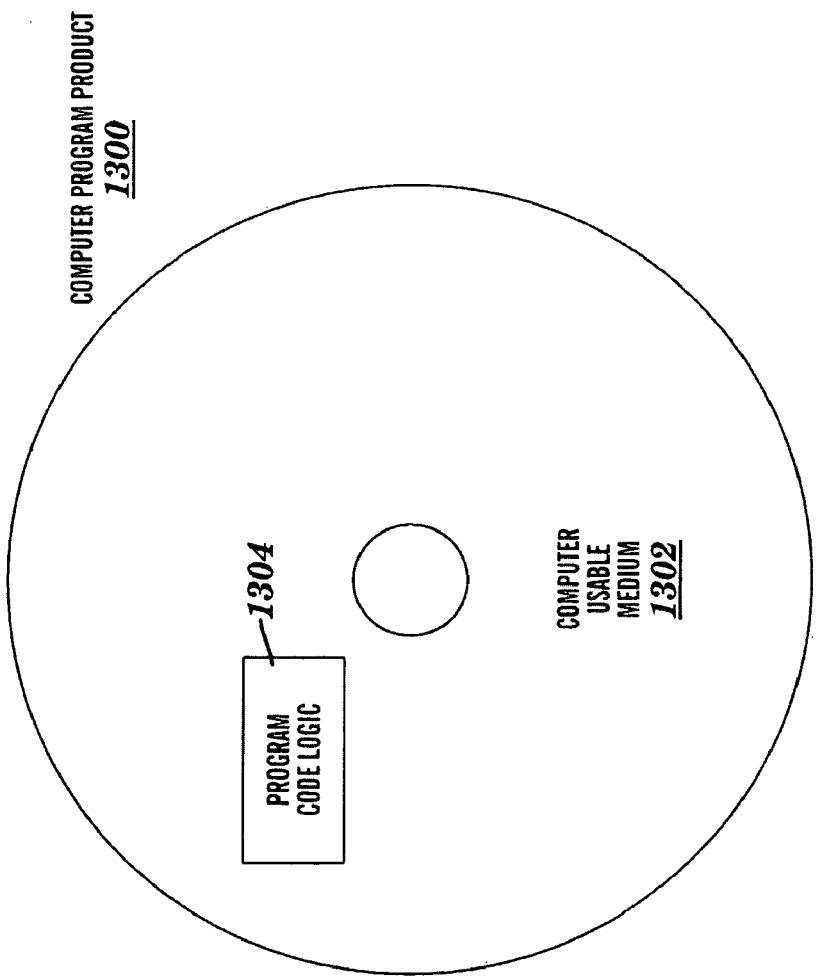
FIG. 13 depicts one embodiment of a computer program product incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1300 as depicted in FIG. 13 on a computer usable medium 1302 with computer program code logic 1304 containing instructions embodied in tangible media as an article of manufacture. Exemplary articles of manufacture for computer usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc., do not denote any order or importance, but rather the terms first, second, etc. are used to distinguish one element from another. Furthermore, the use of the terms a, an, etc., do not denote a limitation of quantity, but rather denote the presence of at least one of the referenced item.

What is claimed is:

1. A computer program product for determining a state of an input/output (I/O) operation in an I/O processing system, comprising:
    a tangible storage medium readable by a processing circuit and storing instructions for executing by the processing circuit for performing a method comprising:
        receiving, at a channel subsystem, a request for performing the I/O operation from an I/O operating system, the request having an associated time period for completion of the I/O operation;
        responsive to the request, forwarding a transport command control block (TCCB) from the channel subsystem to a control unit controlling an I/O device for executing the I/O operation, the TCCB including at least one device control word (DCW) and the TCCB being obtained by a location identified by a transport control word (TCW);
        receiving, at the channel subsystem, an interrogation request from the I/O operating system at a point in time prior to the expiration of the associated time period and absent an indication from the control unit that the I/O operation is completed, the interrogation request for determining the state of the I/O operation, and the point in time within a threshold of the expiration of the associated time period;
        responsive to receipt of the interrogation request at the channel subsystem, sending an interrogation command from the channel subsystem to the control unit to determine the state of the I/O operation; and
        receiving, at the channel subsystem, a response from the control unit indicating the state of the I/O operation, wherein the response includes information indicating a state of the I/O device executing the I/O operation, a state of the control unit controlling the I/O device executing the I/O operation, and the state of the I/O operation being executed.

2. The computer program product of claim 1, wherein the interrogation request includes a request to cancel the I/O operation.

3. The computer program product of claim 1, wherein the interrogation command includes information indicating why and when the interrogation command was sent.

4. The computer program product of claim 1, wherein the information included in the response indicating the state of the control unit indicates whether the control unit is busy, is performing a recovery operation, or is responding to other interrogation requests, and wherein the information included in the response indicating the state of the I/O device indicates whether the I/O device is reserved by a path group, whether the control unit is in a long busy state, or whether the I/O device is performing a recovery process.

5. The computer program product of claim 1, wherein the request includes at least one command having a location specified by a transport command word (TCW), and forwarding the TCCB includes extracting the at least one command from the specified location and sending the TCCB including the at least one command to the control unit.

6. The computer program product of claim 5, wherein receiving the interrogation request includes detecting an update to the TCW, the update including an address of an interrogate device command word (DCW), and sending the interrogation command includes sending the interrogate DCW via an interrogate TCCB.

7. The computer program product of claim 1, wherein the information included in the response from the control unit indicates at least one of: whether an operation is present, executing, waiting for completion of another I/O operation, or waiting for performance of a device-dependent operation, and whether the I/O device is reserved by another I/O processing system.

8. An apparatus adapted for communicating with a control unit controlling an input/output (I/O) device for executing an I/O operation in an I/O processing system, the apparatus comprising:
   a channel subsystem configured to communicate with an I/O operating system and the control unit, the channel subsystem configured to perform a method comprising:
      receiving a request for performing the I/O operation from the I/O operating system, the request having an associated time period for completion of the I/O operation;
      responsive to the request, forwarding a transport command control block (TCCB) to the control unit controlling the I/O device for executing the I/O operation, the TCCB including at least one device control word (DCW) and the TCCB being obtained by a location identified by a transport control word (TCW);
      receiving an interrogation request from the I/O operating system at a point in time prior to the expiration of the associated time period and absent an indication from the control unit that the I/O operation is completed, the interrogation request for determining a state of the I/O operation, and the point in time within a threshold of the expiration of the associated time period;
      responsive to receipt of the interrogation request, sending an interrogation command to the control unit to determine the state of the I/O operation; and
      receiving a response from the control unit indicating the state of the I/O operation, wherein the response includes information indicating a state of the I/O device executing the I/O operation, a state of the control unit controlling the I/O device executing the I/O operation, and the state of the I/O operation being executed.

9. The apparatus of claim 8, wherein the interrogation request includes a request to cancel the I/O operation.

10. The apparatus of claim 8, wherein the interrogation command includes information indicating why and when the interrogation command was sent.

11. The apparatus of claim 8, wherein the information included in the response indicating the state of the control unit indicates whether the control unit is busy, is performing a recovery operation, or is responding to other interrogation requests, and wherein the information included in the response indicating the state of the I/O device indicates whether the I/O device is reserved by a path group, whether the control unit is in a long busy state, or whether the I/O device is performing a recovery process.

12. The apparatus of claim 8, wherein the request includes at least one command having a location specified by a transport command word (TCW), and forwarding the TCCB includes extracting the at least one command from the specified location and sending the TCCB including the at least one command to the control unit.

13. The apparatus of claim 12, wherein the receiving the interrogation request includes detecting an update to the TCW, the update including an address of an interrogate device command word (DCW), and sending the interrogation command includes sending the interrogate DCW via an interrogate TCCB.

14. The apparatus of claim 8, wherein the information included in the response from the control unit indicates at least one of: whether an operation is present, executing, waiting for completion of another I/O operation, or waiting for performance of a device-dependent operation, and whether the I/O device is reserved by another I/O processing system.

15. A method for determining a state of an input/output (I/O) operation in an I/O processing system, comprising:
   receiving, at a channel subsystem, a request for performing the I/O operation from an I/O operating system, the request having an associated time period for completion of the I/O operation;
   responsive to the request, forwarding a transport command control block (TCCB) from the channel subsystem to a control unit controlling an I/O device for executing the I/O operation, the TCCB including at least one device control word (DCW) and the TCCB being obtained by a location identified by a transport control word (TCW);
   receiving, at the channel subsystem, an interrogation request from the I/O operating system at a point in time prior to the expiration of the associated time period and absent an indication from the control unit that the I/O operation is completed, the interrogation request for determining the state of the I/O operation, and the point in time within a threshold of the expiration of the associated time period;
   responsive to receipt of the interrogation request at the channel subsystem, sending an interrogation command from the channel subsystem to the control unit to determine the state of the I/O operation; and
   receiving, at the channel subsystem, a response from the control unit indicating the state of the I/O operation, wherein the response includes information indicating a state of the I/O device executing the I/O operation, a state of the control unit controlling the I/O device executing the I/O operation, and the state of the I/O operation being executed.

16. The method of claim 15, wherein the interrogation request includes a request to cancel the I/O operation.

17. The method of claim 15, wherein the interrogation command includes information indicating why and when the interrogation command was sent.

18. The method of claim 15, wherein the information included in the response indicating the state of the control unit indicates whether the control unit is busy, is performing a recovery operation, or is responding to other interrogation requests, and wherein the information included in the response indicating the state of the I/O device indicates whether the I/O device is reserved by a path group or another I/O processing system, whether the control unit is in a long busy state, or whether the I/O device is performing a recovery process.

19. The method of claim 15, wherein:
  the request includes at least one command having a location specified by a transport command word (TCW), and forwarding the TCCB includes extracting the at least one command from the specified location and sending the TCCB including the at least one command to the control unit; and
  receiving the interrogation request includes detecting an update to the TCW, the update including an address of an interrogate device command word (DCW), and sending the interrogation command includes sending the interrogate DCW via an interrogate TCCB.

20. The method of claim 15, wherein the information included in the response indicating the state of the I/O operations indicates whether an operation is present, executing, waiting for completion of another I/O operation, or waiting for performance of a device-dependent operation.

* * * * *